March 5, 1946.  R. C. GRIFFITH  2,395,811
POWER TRANSMISSION
Filed Feb. 21, 1942
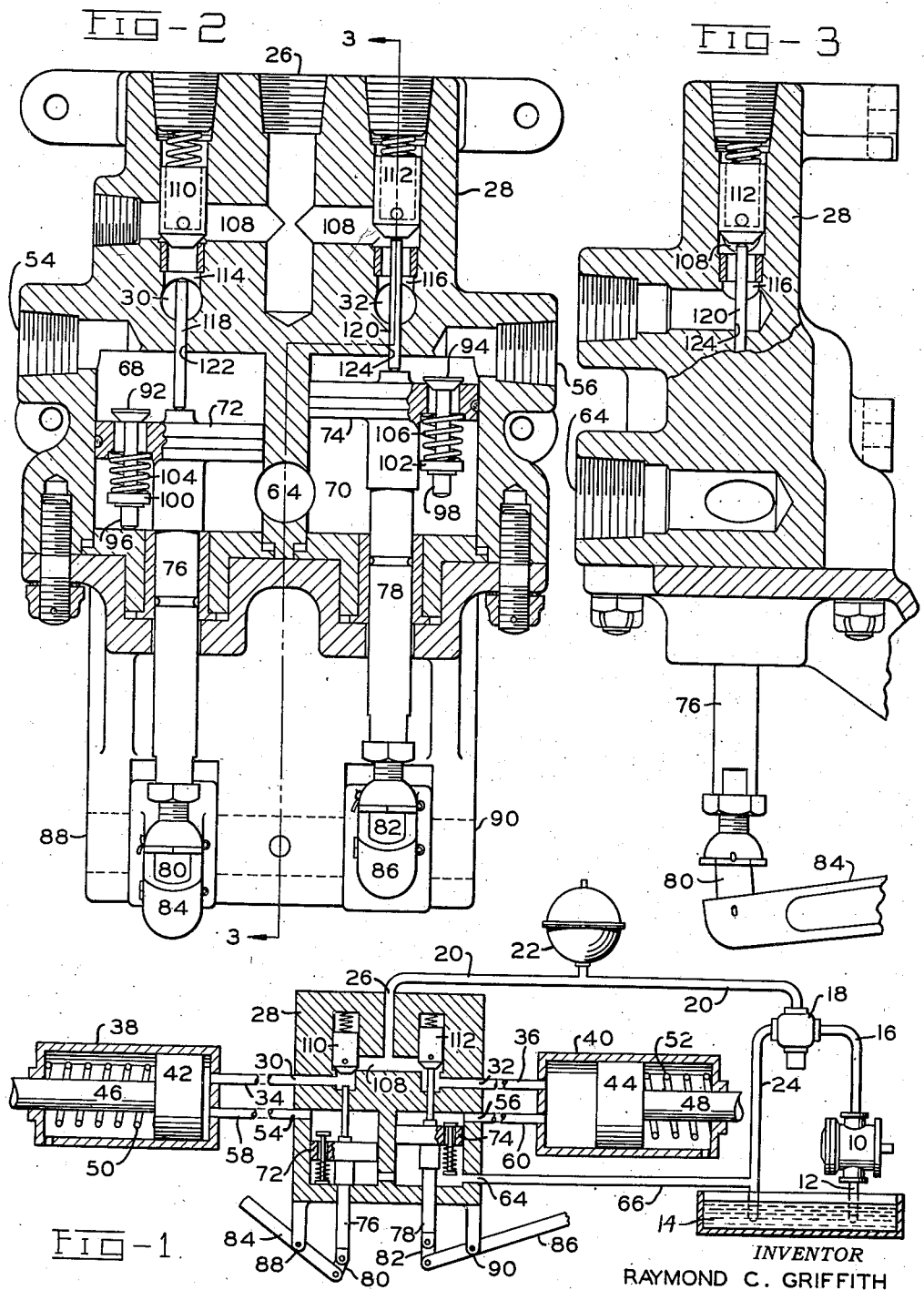
INVENTOR
RAYMOND C. GRIFFITH
BY Ralph L. Tweedale
ATTORNEY Patented Mar. 5, 1946

2,395,811

UNITED STATES PATENT OFFICE 2,395,811

POWER TRANSMISSION

Raymond C. Griffith, Detroit, Mich., assignor to Vickers Incorporated, Detroit, Mich., a corporation of Michigan Application February 21, 1942, Serial No. 431,811

8 Claims. (Cl. 60—54.5)

This invention relates to power transmissions, particularly to those of the type comprising two or more fluid pressure energy translating devices, one of which may function as a pump and another as a fluid motor.

The invention is more particularly concerned with a power transmission system of the type used for operating vehicle brakes such as those of an airplane. It is found necessary, particularly in large airplanes, to provide power-operated means for applying the brakes thereof under manual control. Such aircraft are usually provided with a hydraulic power system for operating various other accessories about the plane, the system acting as a pressure source which may be tapped for various uses. Usually the pressure maintained in the system is several times higher than the maximum pressure which can be used in the hydraulic cylinders which operate the brakes.

Since it is also necessary to provide some type of control valve by which the operator may apply the brakes with varying degrees of force, most brake valves in use at present are of the equalizing type wherein the valve-operating member is provided with means for receiving the pressure at the discharge side of the valve and applying it in opposition to the effort applied by the operator.

Since it is frequently necessary to utilize relatively long lines between the brake valve and the brake operating cylinder, and since, for purposes of lightness, these lines are made relatively small, the resistance thereby introduced between the brake valve and the cylinder is considerable. The present invention takes cognizance of the fact that this line resistance introduces a substantial lag in the action of the equalizing valve during a brake applying operation. It accordingly aims to obviate these difficulties by the provision of a system in which the inlet valve may be fully open so that the high pressure from the source may be fully utilized to overcome line resistance in initially filling the brake cylinder; in other words, to provide a valve in which, during the filling operation, the pressure at the outlet of the valve may be several times higher than the maximum brake operating pressure and, at the same time, to prevent this high pressure from having any tendency to close the valve until the pressure has built up in the brake cylinder.

The invention also aims to provide a valve of this character wherein flow conditions between the inlet valve and the brake cylinder have no effect upon the transmission of the actual brake-operating pressure through the valve-controlling element and to provide a system wherein separate conduits are utilized, one for the transmission of the volume of fluid necessary to fill the brake cylinder, and the other merely as a liquid column for the transmission of brake-operating pressure to the valve-operating member without substantial flow therethrough.

Further objects and advantages of the present invention will be apparent from the following description, reference being had to the accompanying drawing wherein a preferred form of the present invention is clearly shown.

In the drawing:

Figure 1 is a diagrammatic view of a hydraulic brake control circuit incorporating a preferred form of the present invention.

Figure 2 is a cross sectional view of the brake control valve of Figure 1.

Figure 3 is a cross section taken on line 3—3 of Figure 2.

Referring to Figure 1, there is shown a pump 10 which may be of the fixed displacement type and adapted to be driven by any suitable means such as an aircraft engine, not shown. Pump 10 has a suction conduit 12 for withdrawing fluid from a reservoir 14, and a delivery conduit 16. Conduit 16 extends to an unloading valve 18 which directs the pump delivery through a conduit 20 to an accumulator 22 and is adapted to unload the pump delivery to tank through a conduit 24 at negligible pressure when the accumulator is loaded, at the same time blocking back flow from the accumulator toward the pump. The conduit 20 also extends to a pressure port 26 of a double brake control valve 28. Conduits 12 and 24 extend below the liquid level in the tank as is customary in the art.

Valve 28 has two cylinder ports 30 and 32 which are connected by conduits 34 and 36 to the head ends of two brake cylinders 38 and 40, respectively, in which are slidably mounted pistons 42 and 44 on rods 46 and 48. Pistons 42 and 44 are spring biased to their innermost positions by springs 50 and 52, respectively. A second pair of conduits 58 and 60 connect the head ends of cylinders 38 and 40 to back pressure ports 54 and 56, respectively, of valve 28. A tank port 64 of valve 28 is connected to tank by a conduit 66.

Referring now to Figures 2 and 3, the brake control valve 28 is there shown in greater detail. Valve 28 has two main cylinders 68 and 70, the upper ends of which are in communication with the back pressure ports 54 and 56, respectively, while the lower ends are both in communication with the tank port 64. Cylinders 68 and 70 are fitted with pistons 72 and 74, respectively, the rods 76 and 78 of which extend through the bottom of the valve and are connected by links 80 and 82 to brake levers 84 and 86. Levers 84 and 86 are pivoted at 88 and 90 to an arm extension of valve 28. Foot pedals and return springs, not shown, may be suitably connected to levers 84 and 86 for operation thereof.

Pistons 72 and 74 are provided with poppet type valves 92 and 94, respectively, each of which when open connects the upper and lower ends of its cylinder together. Valves 92 and 94 have stems 96 and 98 which project downwardly from their respective pistons and carry spring abutment washers 100 and 102 thereon against which valve springs 104 and 106 act to hold valves 92 and 94 closed. The length of valve stems 96 and 98 is such that either will contact the lower end of its respective cylinder on a down stroke of its piston just before the latter completes its movement.

The pressure port 26 of valve 28 is connected to a passage 108 which extends to two spring-loaded check type valves 110 and 112. Valves 110 and 112 are above cylinders 69 and 70, respectively, and in axial alignment therewith. When open, valves 110 and 112 are adapted to connect passage 108 to passages 114 and 116, respectively. Passages 114 and 116 extend downward from the lower ends of valves 110 and 112 and intersect the cylinder ports 30 and 32, respectively, midway between the said valves and cylinders 68 and 70.

Two valve push rods 118 and 120 are slidably mounted in bores 122 and 124 in axial alignment with valves 110 and 112, respectively. The lower ends of rods 118 and 120 project into the upper end of cylinders 68 and 70 and rest on top of pistons 72 and 74, respectively, while the upper ends project into passages 114 and 116.

In operation, with the pump 10 operating and pistons 42 and 44 in their retracted positions and pistons 72 and 74 in their lowermost positions, fluid is withdrawn from tank 14 through conduit 12 and delivered through conduit 16, valve 18 and conduit 20 to the accumulator 22. When the latter becomes loaded, valve 18 will open and direct the pump delivery back to tank 14. As valves 110 and 112 of valve 28 are closed, there is no escape for pressure fluid in accumulator 22.

If the operator should now depress the lever 84, piston 72 in cylinder 68 will rise. After piston 72 has moved upwardly a short distance, the spring 104 will close poppet valve 92 and the fluid in the upper end of cylinder 68 will be forced out through port 54 and conduit 58 to the head end of cylinder 38.

As piston 72 moves up it lifts the valve push rod 118 which, after a short distance, will contact the lower end of valve 110 and push the same open. Pressure fluid in accumulator 22 is accordingly released through conduit 20, port 26, passage 108, valve 110, passage 114, port 30 and conduit 34 to the head end of brake cylinder 38. Piston 42 then moves to the left causing rod 46 to operate the brake. The pressure developed in cylinder 38 is transmitted to the upper end of cylinder 68 through conduit 58 where it acts on the upper face of piston 72 and tends to move it down against the force applied by the operator at lever 84. Thus, it will be seen that the operator is able to "feel" the force applied to the brake.

Because of the necessity of locating the brake control valve 28 at the operator's position and the brake cylinders 38 and 40 at the brake positions, the conduits 34 and 36 are quite long. The effect of these long conduits is to create a substantial pressure drop therethrough when the accumulator pressure is flowing out to actuate the brake piston. This results in an interval between the time the pressure is released at valve 110, for example, and when that pressure is reached in cylinder 38. However, because of the fact that the pressure acting on piston 72 is transmitted thereto directly from cylinder 38 through conduit 58, in which no flow is taking place, the "feel" that the operator receives is actually that of the pressure applied to the brake.

The positions of piston 72 and valve 110 now correspond to the positions of piston 74 and valve 112 as shown in the drawing.

When the brake is applied with the desired force, as determined by the "feel" at lever 84, the operator may release lever 84 slightly to allow the pressure in the upper end of cylinder 68 to move piston 72 and push rod 118 down until valve 110 closes. In this position piston 42 is held projected to the left.

If it is desired to secure a higher pressure in cylinder 38 to move piston 42 and its rod 46 farther to the left, lever 84 is further depressed to open valve 110 and admit more pressure fluid to cylinder 38. As soon as valves 110 and 112 close, any movement of pistons 72 and 74 away from the valves merely causes the liquid in cylinder 40—42, etc., to flow back in unison with the downward movement of 72 and 74, reducing the pressure on pistons 42 and 44, and movement of 72 and 74 towards the valves (after the valves have been closed) will return that liquid and at the same time still give the operator the "feel" of the brakes.

To fully retract the piston 42 and rod 46, lever 84 is released which permits pressure in cylinder 68 to move piston 72 down to its lowermost position, as shown in the drawing, where valve stem 96 abuts the bottom of cylinder 68 to open valve 92. Accordingly, spring 50 moves piston 42 and rod 46 to the right with the fluid in cylinder 38 passing to tank through conduit 58, cylinder 68, valve 92 in piston 72, port 64 and conduit 66.

It will be noted that, in distinction to previous equalizing valves, the operator does not "feel" the outlet pressure at the equalizing valve. Thus, the inlet valve may be opened fully, and the high source pressure may be allowed to build up beyond the inlet valve and thus be available to overcome line resistance between the inlet valve and the brake cylinder. It is only when the pressure at the brake cylinder is built up to the desired value that the operator "feels" any reaction on his operating pedal. This insures not only a more rapid action, but also avoids considerable difficulty heretofore experienced in what may be termed an "overriding" action which has been particularly troublesome where the normal brake operating pressure is but a small fraction of the pressure available at the source.

The operation of piston 44 and rod 48 of brake cylinder 40 is controlled by piston 74 and valve 112 through lever 86 in the same manner as lever 84, piston 72 and valve 110 control piston 42.

While the form of embodiment of the invention as herein disclosed constitutes a preferred form, it is to be understood that other forms might be adopted, all coming within the scope of the claims which follow.

What is claimed is as follows:

1. In a hydraulic power system for operating brakes and the like, the combination with a pressure source and a brake-operating motor of an equalizing valve having an inlet and an exhaust valve, a separate inlet port for carrying fluid from the valve to the motor and a separate outlet port for carrying fluid from the motor to the exhaust valve, a valve-operating member for opening the inlet valve upon forward movement thereof and opening the exhaust valve upon rearward movement, there being a substantial range of travel during which both valves are closed, and means associated with said member and responsive to motor pressure for resisting forward movement in proportion to such pressure and effective within said range to supply or exhaust fluid from the motor by direct displacement independently of said inlet and exhaust valves.

2. In a hydraulic power system for operating brakes and the like, the combination with a pressure source and a brake-operating motor of an equalizing valve having an inlet and an exhaust valve, a valve-operating member for opening the inlet valve upon forward movement thereof and opening the exhaust valve upon rearward movement, there being a substantial range of travel during which both valves are closed, separate conduits extending between the equalizing valve and the motor, one serving as the supply conduit from the inlet valve and the other serving as the return conduit to the exhaust valve, and means associated with said member and responsive to motor pressure for resisting forward movement of said member in proportion to such pressure.

3. In a hydraulic power system for operating brakes and the like, the combination with a pressure source and a brake-operating motor of an equalizing valve having an inlet and an exhaust valve, a valve-operating member for opening the inlet valve upon forward movement thereof and opening the exhaust valve upon rearward movement, there being a substantial range of travel during which both valves are closed, separate conduits extending between the equalizing valve and the motor, one serving as the supply conduit from the inlet valve and the other serving as the return conduit to the exhaust valve, and means associated with said member and responsive to motor pressure for resisting forward movement of said member in proportion to such pressure, said last means being connected to receive motor pressure through one of said conduits while the other is carrying flowing fluid.

4. In a hydraulic power system for operating brakes and the like, the combination with a pressure source and a brake-operating motor of an equalizing valve having an inlet and an exhaust valve, a valve-operating member for opening the inlet valve upon forward movement thereof and opening the exhaust valve upon rearward movement, there being a substantial range of travel during which both valves are closed, separate conduits extending between the equalizing valve and the motor, one serving as the supply conduit from the inlet valve and the other serving as the return conduit to the exhaust valve, and means associated with said member and responsive to motor pressure for resisting forward movement of said member in proportion to such pressure, said last means being connected to receive motor pressure through the return conduit while the supply conduit is carrying flowing fluid.

5. In a hydraulic power system for operating brakes and the like, the combination of a pressure fluid source, a motor cylinder, means including an inlet valve and a conduit leading therefrom to the motor cylinder for supplying operating fluid thereto, manual means for opening said valve, pressure-responsive means for effecting closure of said valve, a separate conduit leading from the motor to the closing means whereby pressures built up at the valve due to conduit resistance are isolated from the closing means, and an exhaust valve operated by the pressure-responsive means to open after the inlet valve closes, said manual and pressure responsive means providing a substantial range of travel during which both valves are closed, said exhaust valve being connected to said motor through said separate conduit.

6. In a hydraulic power system for operating brakes and the like, the combination of a pressure fluid source, a motor cylinder, means including an inlet valve and a conduit leading therefrom to the motor cylinder for supplying operating fluid thereto, manual means for opening said valve, pressure-responsive means for effecting closure of said valve, an exhaust valve operated by the pressure responsive means, and a separate conduit leading from the motor to the closing means and the exhaust valve whereby pressures built up at the inlet valve due to conduit resistance are isolated from the closing means, said pressure-responsive means comprising a piston effective to regulate the pressure in the motor cylinder to a substantial extent by manual effort utilizing the liquid in said separate conduit as a column.

7. In a hydraulic power system for operating brakes and the like, the combination of a pressure fluid source, a motor cylinder, an equalizing valve connected with the source and having a conduit leading to the motor, said valve having a member shiftable in one direction to admit fluid to the motor, and in the opposite direction to exhaust fluid therefrom, means associated with said member for urging it in said opposite direction in response to pressure, and a second conduit leading from the motor cylinder to said means, said second conduit and pressure-responsive means together providing a means whereby the cylinder pressure may be manually controlled by direct liquid column action over a substantial range, said second conduit also constituting the sole path for fluid exhausting from the motor cylinder.

8. In a hydraulic power system for operating brakes and the like, the combination of a pressure fluid source, a motor cylinder, means including an inlet valve and a conduit leading therefrom to the motor cylinder for supplying operating fluid thereto, manual means for opening said valve, pressure-responsive means for effecting closure of said valve, a separate conduit leading from the motor to the closing means whereby pressures built up at the valve due to conduit resistance are isolated from the closing means, and an exhaust valve connected to the motor solely through said separate conduit and operated to open position by a substantial travel of the pressure-responsive means beyond its inlet valve closing position, said pressure-responsive means acting within said substantial range of travel as a direct liquid column type pressure generating means.

RAYMOND C. GRIFFITH.